F. B. FARMER & W. V. TURNER.
FLUID PRESSURE BRAKE.
APPLICATION FILED SEPT. 1, 1904.
959,128.  Patented May 24, 1910.
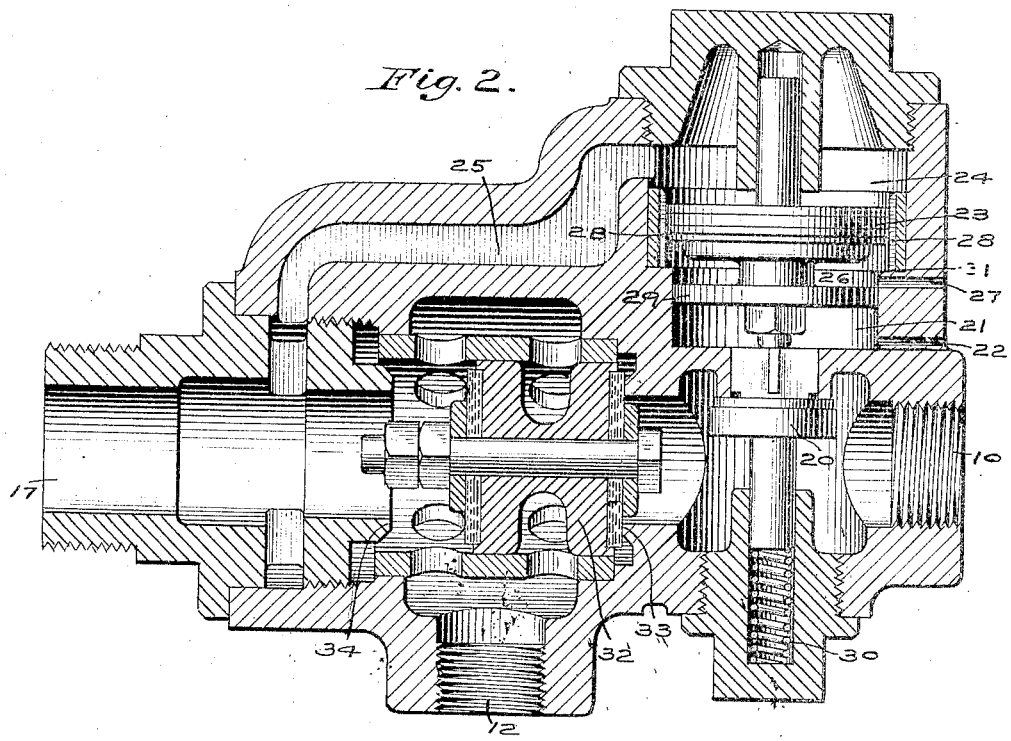
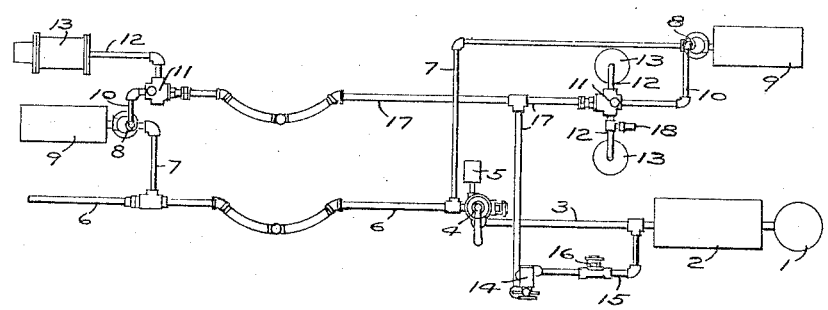
WITNESSES  INVENTORS

UNITED STATES PATENT OFFICE.

FRED B. FARMER, OF ST. PAUL, MINNESOTA, AND WALTER V. TURNER, OF WILKINSBURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

FLUID-PRESSURE BRAKE.

959,128.

Specification of Letters Patent. Patented May 24, 1910.

Application filed September 1, 1904. Serial No. 223,041.

*To all whom it may concern:*

Be it known that we, FRED B. FARMER and WALTER V. TURNER, citizens of the United States, residing, respectively, at St. Paul, county of Ramsey, State of Minnesota, and Wilkinsburg, county of Allegheny, State of Pennsylvania, have invented certain new and useful Improvements in Fluid-Pressure Brakes, of which the following is a specification.

This invention relates to fluid pressure (air) brake apparatus, and more particularly to a combined automatic and straight air brake equipment as applied to locomotives.

The present standard apparatus comprises, in addition to the usual main reservoir, engineer's brake valve, train pipe, triple valve, auxiliary reservoir and brake cylinder of the automatic system, a straight air brake valve and pipe leading to a double check valve located at a point between the triple valve and the brake cylinders, the check valve being adapted to engage one seat for closing communication from the straight air brake valve and open communication from the triple valve to the brake cylinders when the brakes are applied by the engineer's brake valve of the automatic system, and to move to its opposite seat for closing communication from the triple valve and open communication from the straight air brake valve to the brake cylinders. With this standard apparatus, when the brakes are applied with the straight air or direct system, it is possible to make a service application with the automatic system and thereby greatly increase the brake cylinder pressure to such a point as to endanger the sliding of the wheels. It is also difficult when the automatic brake is applied with the present construction to apply the straight air brake on the locomotive and tender without first releasing the automatic brake. When the automatic brake is applied on locomotive and train it is very desirable to be able to first release the automatic brake on the locomotive and make a straight air application on the locomotive but without releasing the automatic train brakes. The train brakes may then be released and recharged in the usual way, while the locomotive brakes are held applied with straight air. Then when a service reduction in train pipe pressure is again made for applying the automatic train brakes it is important that the pressure with which the locomotive brakes are previously held applied with the direct system should not be increased. It is also important to be able to obtain augmented brake cylinder pressure on the locomotive, even with the straight air brake applied, when an emergency application is made with the automatic system.

The object of this invention is to provide means which may be applied to the present standard combined straight air and automatic equipment whereby, first, the automatic brake on the locomotive may be released by the application of straight air; second, the locomotive brake cylinder pressure when applied with straight air will not be increased by a service application of the automatic system; and third, the emergency application of the automatic system will operate to supply additional pressure to the locomotive brake cylinders even when the straight air brake is already applied.

In the accompanying drawing; Figure 1 is a diagram showing a combined straight air and automatic brake apparatus as applied to a locomotive and tender; and Fig. 2 a sectional view showing the double check valve combined with our improved valve device.

As indicated in Fig. 1, the apparatus comprises the air pump 1, main reservoir 2, main reservoir pipe 3, engineer's brake valve 4 having equalizing reservoir 5, train pipe 6, branch pipe 7, triple valve 8, auxiliary reservoir 9, pipe 10 leading from the triple valve to double check valve 11, pipes 12 leading to the brake cylinders 13, safety valve 18, straight air brake valve 14 connected to the main reservoir by pipe 15 containing reducing valve 16, and pipe 17 leading from straight air brake valve to the double check valves on both engine and tender, all of which comprises the present standard apparatus, the construction and operation of which is well understood by those familiar with the art and therefore requires no further description.

According to our improvement a valve device operated by pressure from the straight air brake valve is provided for controlling communication from the pipe 10, leading from the triple valve to the double check valve, to the atmosphere. A preferred form of such valve device is shown more particularly in Fig. 2, wherein the same is for convenience illustrated as combined with the double check valve. According to this construction the valve 20 controls communication from pipe 10 to chamber 21 which is open to the atmosphere through ports 22. A piston 23 is provided for operating said valve, the chamber 24 above the piston being connected with pipe 17 through passage 25, and the chamber 26 beneath the piston being open to the atmosphere through ports 27. Grooves 28 are located in the cylinder bushing around the piston 23 and the chambers 26 and 21 are preferably separated from each other by means of a diaphragm or piston 29, which may be secured on the stem of piston 23. A spring 30 acts to hold the valve 20 normally closed.

The operation of our improved device is as follows: When an ordinary service application of the brakes is made with the engineer's brake valve of the automatic system, air from the triple valve flows through pipe 10, forces the valve 32 of the double check valve over against its seat 34 and passes to the brake cylinder through pipe 12, the valve 20 being held tightly closed by spring 30 and by the brake cylinder pressure in pipe 10. If, then, it is desired to release the engine brakes without releasing the automatic train brakes, or if it is desired to control the engine brakes by means of the straight air brake valve independently of the automatic system, the straight air brake valve is opened to supply air to pipe 17 and through passage 25 to the chamber 24. This pressure acting on piston 23 forces the same down to its seat upon the shoulder 31 and opens the valve 20, thereby releasing air from pipe 10 to the atmosphere through chamber 21 and ports 22. The pressure in pipe 17 then moves valve 32 over to its opposite seat and opens communication from the pipe 17 to pipe 12 and the brake cylinders on the locomotive, so that the same may then be applied or released by means of the straight air brake valve independently of the automatic system. When it is desired to release the automatic train brakes for the purpose of recharging the auxiliary reservoirs, the locomotive brakes may be held applied with straight air, the piston 23 being seated and the vent valve 20 held open. Then if the automatic brakes are again applied in service application the air which is supplied from the triple valve to pipe 10 on the locomotive will escape to the atmosphere through the valve 20 and not increase the brake cylinder pressure.

If the locomotive brake should be applied with straight air when an emergency application is made with the automatic system the sudden rush of air from the triple valve through pipe 10 and valve 20 into chamber 21 creates sufficient pressure therein to lift the pistons 29 and 23 and allow the valve 20 to close. The pressure in pipe 10 which is then greater than in the straight air pipe 17 shifts the check valve 32 to its opposite seat and opens communication from the triple valve to the brake cylinder, whereby the emergency braking pressure is secured. When the air under pressure acts in this manner upon the underside of the piston 29 and raises the same sufficiently to move piston 23 away from its seat the grooves 28 are then opened around the piston 23, so that the pressure above the same is released to the atmosphere through chamber 26 and vent ports 27 and does not prevent the pistons from rising sufficiently to close valve 20. And this is an important feature, since otherwise the pistons might move up only far enough to partially close valve 20, at which time the opposing pressures in chambers 21 and 24 would be balanced and the air from the triple valve would all escape to the atmosphere at the very time that the maximum braking pressure is required.

It will be apparent that this feature of our invention contemplates the use of any means operated by the sudden rush of air in emergency applications for releasing the pressure from the chamber above the piston 23 or from the pipe leading from the straight air brake valve.

Having now described our invention, what we claim as new and desire to secure by Letters Patent is:—

1. The combination with an automatic air brake system and a straight air brake apparatus, of means operated by air from the straight air brake valve to permit the release of the brake after an automatic application.

2. The combination with an automatic air brake system and a straight air brake apparatus, of means operated by the locomotive brake cylinder pressure when the straight air is applied, for preventing a further supply of air to the brake cylinder by the automatic system in service applications.

3. The combination with an automatic air brake system and a straight air brake apparatus, of means operated by the locomotive brake cylinder pressure when the straight air is applied, for venting to the atmosphere any further supply of air from the triple valve in a service application of the automatic system.

4. The combination with an automatic air brake system comprising an engineer's brake valve, train pipe, triple valves, and brake cylinders, of a straight air brake valve for also supplying the locomotive brake cylinders, and means operated by pressure from the straight air brake valve for opening communication to the atmosphere from the service supply from the triple valve.

5. The combination with an automatic air brake system comprising an engineer's brake valve, train pipe, triple valves, and brake cylinders, of a straight air brake valve for also supplying the locomotive brake cylinders, and a valve device having a piston operated by air from the straight air brake valve for releasing the air supplied to the locomotive brake cylinders by the automatic system in service applications.

6. The combination with an automatic air brake system and a straight air brake apparatus, of a valve device operated by air from the straight air brake valve for opening communication from the triple valve brake cylinder supply to the atmosphere, and means operated by the sudden rush of air in emergency applications for closing said vent opening.

7. The combination with a combined automatic and straight air brake apparatus comprising an engineer's brake valve, train pipe, triple valve, auxiliary reservoir, brake cylinder, straight air brake valve, and double check valve, of a valve device operated by air from the straight air brake valve for releasing air from the pipe or passage connecting the triple valve and double check valve.

8. The combination with a combined automatic and straight air brake apparatus comprising an engineer's brake valve, train pipe, triple valve, auxiliary reservoir, brake cylinder, straight air brake valve, and double check valve, of a valve device operated by air from the straight air brake valve for releasing air from the pipe or passage connecting the triple valve and double check valve, and means operated by a sudden rush of air from the triple valve in emergency applications for closing said valve device.

9. The combination with a combined automatic and straight air brake apparatus comprising an engineer's brake valve, train pipe, triple valve, auxiliary reservoir, brake cylinder, straight air brake valve, and double check valve, of a vent valve for controlling communication from the triple valve side of the double check valve to the atmosphere, a piston subject to air pressure from the straight air brake valve for opening said vent valve, and a leakage port or groove adapted to be closed when the piston is seated.

10. The combination with a combined automatic and straight air brake apparatus comprising an engineer's brake valve, train pipe, triple valve, auxiliary reservoir, brake cylinder, straight air brake valve, and double check valve, of a vent valve for controlling communication from the triple valve side of the double check valve to the atmosphere, a piston subject to air pressure from the straight air brake valve for opening said vent valve, and another piston subject to the sudden rush of air from the triple valve in emergency applications for moving the first piston and allowing the vent valve to close.

11. The combination with an automatic air brake system and a straight air brake apparatus, of means operated by air from the straight air brake valve for opening communication to said valve from the brake cylinder.

In testimony whereof we have hereunto set our hands.

FRED B. FARMER.
WALTER V. TURNER.

Witnesses as to Farmer:
AGNES V. MURPHY,
R. G. RHOADES.

Witnesses as to Turner:
R. F. EMERY,
E. A. WRIGHT.